United States Patent [19]
Kemper et al.

[11] Patent Number: 5,579,660
[45] Date of Patent: Dec. 3, 1996

[54] MODULAR IN-LINE GEAR SHIFTING MECHANISM FOR AN OFF-HIGHWAY IMPLEMENT

[75] Inventors: Philip T. Kemper; Thomas G. Lykken, both of Fargo, N. Dak.

[73] Assignee: Case Corporation, Racine, Wis.

[21] Appl. No.: 285,805

[22] Filed: Aug. 4, 1994

[51] Int. Cl.$^6$ .................................................. B60K 20/04
[52] U.S. Cl. .......................................... 74/473 R; 74/538
[58] Field of Search ........................... 74/538, 475, 473 R

[56] References Cited

U.S. PATENT DOCUMENTS

| | | | |
|---|---|---|---|
| 3,757,598 | 9/1973 | Van Dest | 74/473 R |
| 3,815,543 | 6/1974 | Bush | 74/475 X |
| 4,028,959 | 6/1977 | Long | 74/473 R |
| 4,143,560 | 3/1979 | Kinkade et al. | 74/473 R |
| 4,222,284 | 9/1980 | Bellino | 74/473 R |
| 4,515,033 | 5/1985 | Carlo | 74/538 X |
| 4,879,922 | 11/1989 | Suzuki | 74/473 R X |
| 5,156,060 | 10/1992 | Shirahama et al. | 74/475 |
| 5,351,570 | 10/1994 | Mizunuma et al. | 74/473 R X |
| 5,388,476 | 2/1995 | Harger et al. | 74/473 R |

*Primary Examiner*—Rodney H. Bonck
*Assistant Examiner*—Troy Grabow
*Attorney, Agent, or Firm*—Rudnick & Wolfe

[57] ABSTRACT

A shift mechanism for a multi-speed transmission of an off-highway implement. The shift mechanism includes an in-line shifter assembly that connects to first and second actuators on the transmission. The shifter assembly is configured to shift the transmission between speed ratios under one-handed control and comprises a first controller that is movable along a monoplanar path of travel and a second controller that is carried by the first controller and is movable between two vertical positions. The shifter assembly is connected to a selected one of the transmission actuators as a function of the vertical position of the vertically movable controller. Back and forth movements of the other controller moves the selected one of the transmission actuators into a position which conditions the transmission for operation in a selected speed ratio. The shifter assembly is pivotally mounted on a housing to form a modular unit that can be mounted at the work station of the implement and thereafter is connectable to the transmission actuators through suitable force transfer mechanisms.

31 Claims, 9 Drawing Sheets

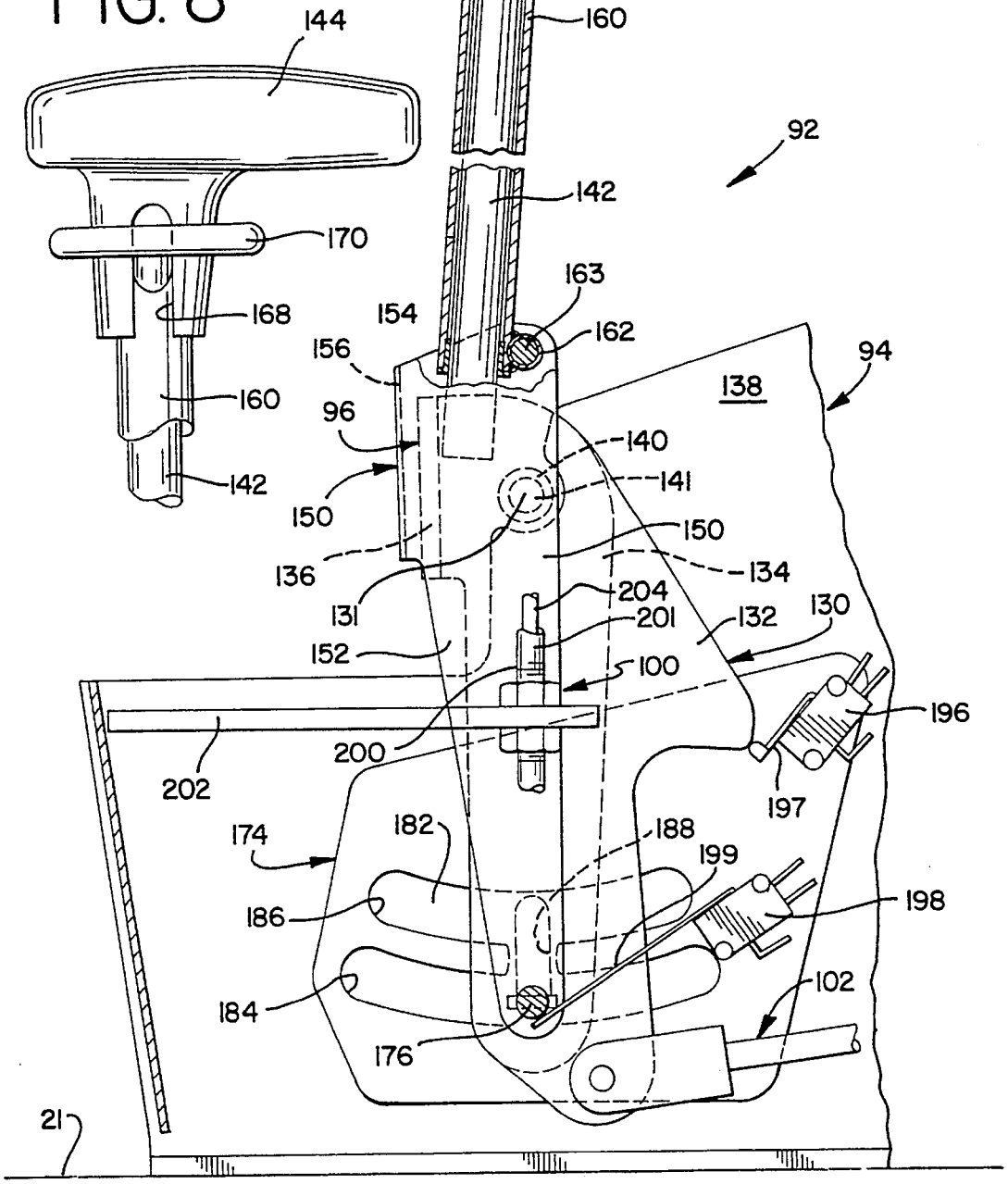

MODULAR IN-LINE GEAR SHIFTING MECHANISM FOR AN OFF-HIGHWAY IMPLEMENT

FIELD OF THE INVENTION

The present invention relates to a shifting mechanism for conditioning a multi-speed transmission of an off-highway implement and, more particularly, to a modular shifting mechanism having a vertical in-line shifting pattern for conditioning the transmission of an off-highway implement.

BACKGROUND OF THE INVENTION

With the ever increasing goal of reducing manufacturing costs, many manufacturers of off-highway implements are designing frames and sub-assemblies which can be commonly used on more than one implement model. From a manufacturing perspective, it is beneficial to have a common frame design for a wide variety of implements. Accordingly, one power train assembly design including the stone engine and transmission combination can be used on more than one off-highway implement model. This modular design concept likewise extends to work stations or cab enclosures and furthermore to shift mechanisms used to condition the transmission of the power train assembly.

Multiple speed transmissions of the type that are used in agricultural and off-highway implements are typically arranged in combination with a self-propelled engine that is operated at a substantially constant speed. The ground speed of the implement is determined by the particular gear ratio or condition of the transmission. Transmissions of off-highway implements are typically provided with at least two speed ranges and four or more gear ratios in each speed range setting.

The range setting and speed setting for the transmission are usually made by moving separate shift levers. The shift lever is connected to suitable transfer linkage which responds to movement of the shift lever through a shift pattern to condition the transmission. Sometimes, the forward, neutral or reverse setting is determined by the position of another lever. Besides the various shift levers, off-highway implements, such as agricultural combines or cotton harvesters, are replete with other control mechanisms arranged in a cab area or other driving compartment of the implement. Accordingly, the implement operator may use one hand to condition the transmission while utilizing the other hand to control any of several other mechanisms during continuous operation of the implement.

As is well known, the speed ratio of the transmission is selected by having the operator move a shift lever through a generally horizontal H-pattern. The H-pattern defines at least three different fore-and-aft limit positions with a neutral range or position being defined by the "cross bar" of the H-shift pattern.

Although the standard horizontal H-type shift pattern is popular and widely used on a variety of off-highway implements, in some situations, for example, where the driving compartment has limited space constraints and especially where the shift lever is disposed proximate to one side wall of the driving compartment, there is not always enough room for the shift lever to move through a standard H-type shift pattern. In those situations where space constraints prohibit movement of the shift lever through a standard H-type shift pattern, and for other reasons alternative shift mechanisms may either be required or desired.

Thus, there remains a need and a desire for a transmission shift mechanism having a modular design and which is capable conditioning a transmission of an off-highway implement through a plurality of speed ratios without requiring side-to-side movement of the shift lever.

SUMMARY OF THE INVENTION

In view of the above and in accordance with the present invention, there is provided a shift mechanism for conditioning a transmission of an off-highway agricultural implement such as a combine or cotton harvester. The transmission has a plurality of gear meshes capable of developing a plurality of speed ratios between input and output ends thereof. A first actuator, such as a shift rail, is associated with first and second gear meshes of the transmission and has at least two speed ratio positions. A second actuator, such as a second shift rail, is associated with a third gear mesh of the transmission and has at least a third ratio position. As will be appreciated, each speed ratio position of the actuators is effective to condition a transmission into a different speed ratio.

The shift mechanism of the present invention includes a shifter assembly that is connectable to the first and second actuators for manually conditioning the transmission into the selected speed ratio. The shifter assembly is configured to shift the transmission between speed ratios under one-handed control and comprises a manually shiftable controller that moves along a monoplanar path of travel between forward and rearward positions and another manually movable controller that is mounted for movement along a vertical path of travel. Notably, the vertically movable controller is mounted on and for movement with the other controller to promote one-handed operation of the shifter assembly. The shifter assembly is connected to a selected one of the actuators as a function of the position of the vertically movable controller. In the illustrated form of the invention, a force transfer mechanism selectively connects the vertically movable controller to either of the actuators. The other controller is likewise connected to the actuators through a force transfer mechanism such that back and forth movements of the controller moves the selected one of the actuators into a speed ratio position thereby conditioning the transmission into a selected speed ratio.

In a preferred form of the invention, the shifter assembly is mounted on a housing that fits into the cab region of the implement as a modular assembly. As such, the shifter assembly can be preassembled to the housing outside of the cab region of the implement and subsequently installed as a modular unit to the implement.

In one form of the invention, the forward and rearwardly shiftable controller includes a vertically elongated shift lever. The shift lever is mounted intermediate its ends for rocking movement about a fixed axis. The vertically movable controller preferably includes an elongated slide having an upper end that is engageable by the operator and is effective to both move the controller vertically as well as rock the other controller about its fixed axis. In a most preferred form of the invention, the vertically movable controller moves and is guided along a lengthwise portion of the shift lever between two extreme vertical positions.

At a lower end, the elongated slide includes a pin that passes through a shift gate defining a shift pattern thereby influencing the vertical movement of the second controller. The elongated shift lever is provided with a vertically elongated slot that accommodates the pin for vertical movement. Notably, the shift pattern is arranged in a generally vertical disposition. In a most preferred form of the invention, the shift pattern has a generally H-shape including two generally parallel vertically spaced and elongated slots that permit back and forth movement of the shift lever to effect changes in the speed ratios of the transmission and which are joined to each other by a generally vertical slot. The vertical slot in the shift pattern corresponds to a neutral condition for the transmission and permits vertical movement of the pin between the elongated slots.

Because the shift lever is confined to generally monoplanar back and forth shifting movements, the shift lever will be twice moved into at least one of the fore and aft positions to effect two different speed ratios conditions for the transmission. To facilitate the operators' knowledge of which speed ratio the transmission is conditioned for operation, the shift mechanism of the present invention further includes a display for visually indicating the speed ratio condition that has been selected for the transmission. The display operates in response to signals received frown sensors that monitor the relative position of the movable controllers.

Because the shift mechanism of the present invention includes a shift lever that moves back and forth in a single vertical path of movement or plane, it is particularly useful in relatively tight space constraints that are present in cabs of agricultural or off-highway equipment. Moreover, permitting the shift lever to rock back and forth between positions to accomplish all of the speed ratio conditions for the transmission rather than requiring side-to-side movement thereof to condition the transmission permits the shift mechanism of the present invention to be readily suited for use adjacent to a side wall of the cab region of the off-highway equipment. With the present invention, the vertically movable controller moves along and with the shift lever to select which of the two actuators are to be activated. By positioning the second vertically movable controller for guided movement on the shift lever, one-handed operation of the shift mechanism is easily accomplished, thus allowing the operator to use the other hand to attend to a myriad of other activities associated with operation of the combine or cotton harvester.

An additional advantage of the present invention relates to the modular nature thereof. That is, the shift mechanism is mountable on the housing which is thereafter inserted into the cab region of the cotton harvester or combine. The force transfer mechanisms extending from the shifter assembly are readily connectable to the transmission following assembly of the shifter assembly into the implement thereby facilitating repair and/or replacement of the shift mechanism of the present invention when required.

These and other objects, aims and advantages of the present invention will become readily apparent from the following detailed description, the appended claims, and the following drawings.

DETAILED DESCRIPTION OF THE DRAWINGS

FIG. 7 is a side elevational view, partially in section, of the shift mechanism of the present invention;

FIG. 8 is a fragmentary front elevational view of the upper end of the shift mechanism of the present invention;

FIG. 10 is a sectional view taken along line 10—10 of FIG. 4; and

DETAILED DESCRIPTION OF PRESENT INVENTION

Figure 1:
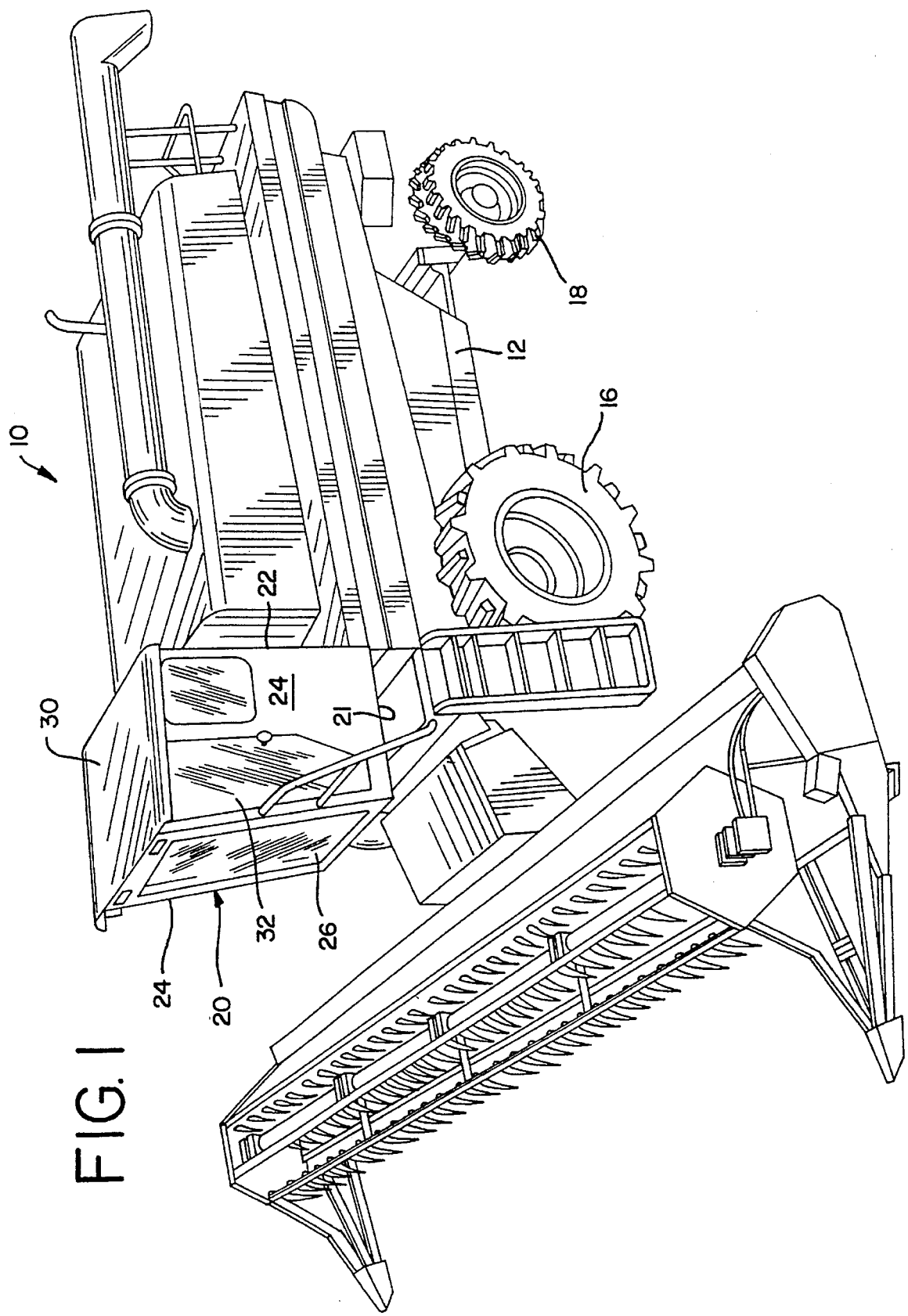
FIG. 1 is a perspective view of an agricultural implement to which the gear shifting mechanism of the present invention is applied.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals indicate like parts throughout the several views, the present invention is arranged in combination with and, after being installed, forms and integral part of an off-highway implement such as an agricultural combine or cotton harvester generally designated by reference numeral 10. The implement includes an undercarriage or frame 12 and a power train assembly 14 (FIG. 3) that are of a modular design. That is, the frame 12 and power train assembly 14 for the illustrated agricultural combine 10 are the same subassemblies used on cotton harvesters. Each piece of agricultural equipment further includes a pair of front drive wheels 16 and a pair of rear steerable wheels 18.

Figure 2:
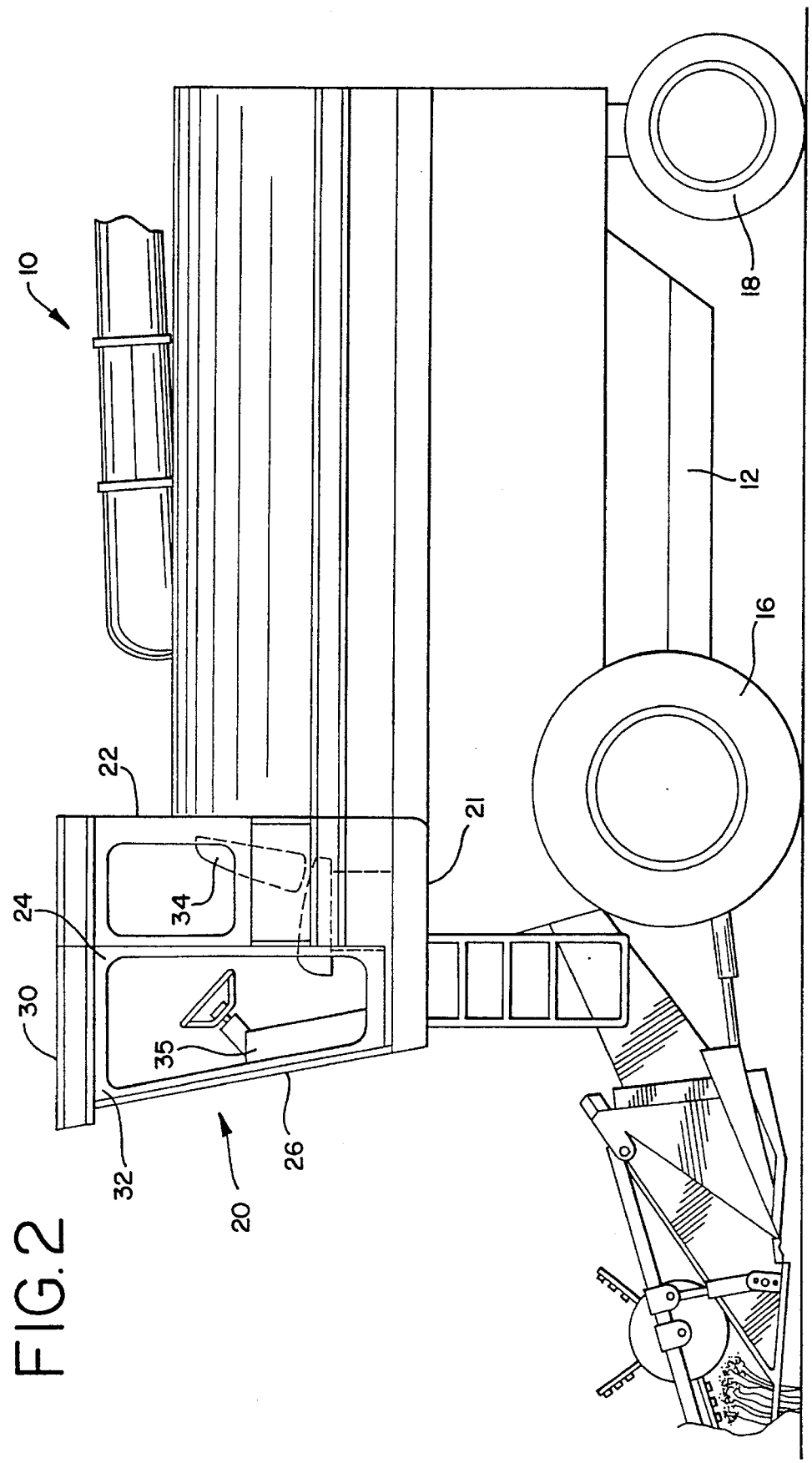
FIG. 2 is a side elevational view of the agricultural implement.

Both an agricultural combine and cotton harvester are each equipped with an enclosed cab station or work station 20 arranged at a forward end of the frame 12. As shown in FIGS. 1 and 2, the enclosure 20 is generally rectangular in shape and includes a floor 21, a rear wall 22, opposite side walls 24, a front wall 26 and a roof 30. In the illustrated embodiment, and to enable visual access to the ancillary mechanisms associated with the implement, the front wall 26 of the enclosure is a window that preferably extends substantially the entire length between the floor 21 and the roof 30 and spans the lateral distance between the side walls 24. To provide access and egress form the enclosure 20, at least one of the side walls 24 is provided with a door 32.

As shown in FIG. 2, the operator station 20 further includes a seat 34 disposed rearwardly of the front window 26 and rearwardly of an upright steering column 35. As is conventional, a myriad of controls and equipment are ergonomically arranged about the seat to allow the operator to control the implement and the ancillary mechanisms thereof while remaining comfortably seated.

Figure 3:
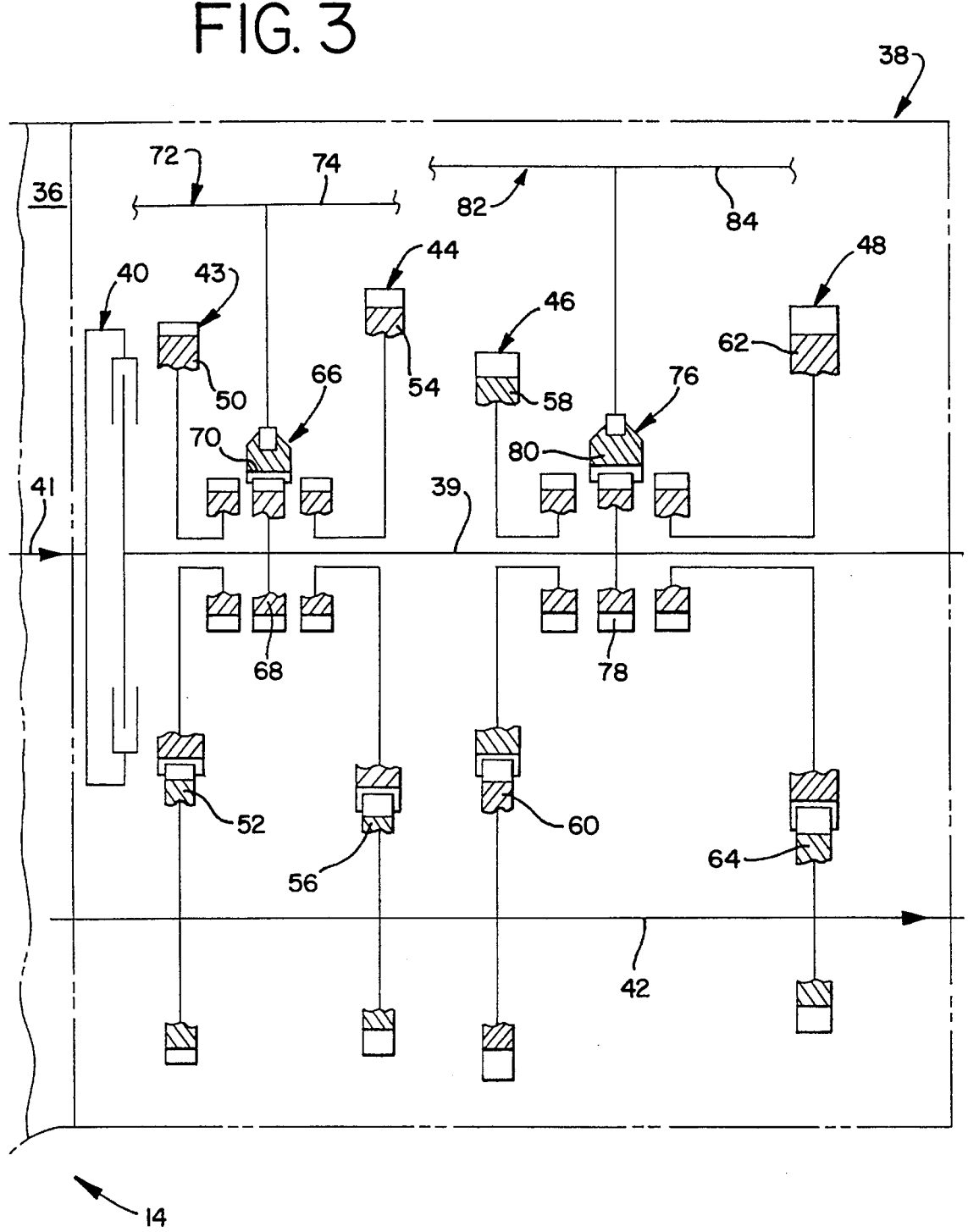
FIG. 3 is a schematic diagram of a transmission that is controlled by the shifting mechanism of the present invention.

Turning to FIG. 3, the power train assembly 14 for the agricultural implement includes a conventional self-propelled engine 36 and a conventional multi-speed transmission 38. As shown, the transmission 38 has an input shaft 39 that is connected, as by clutch 40, to an output shaft 41 of engine 36. The transmission 38 further includes an output shaft 42. Between the input and output shafts 39 and 42, respectively, the transmission is provided with at least four different gear meshes 43, 44, 46 and 48 for developing four different power paths between the input shaft 39 and output shaft 42 of the transmission 38 thereby developing four different speed ratio conditions for the transmission.

In the simplified transmission schematically illustrated for the limited purposes of this disclosure, the four different gear meshes 43, 44, 46 and 48 illustrate four different forward power paths through the transmission. As will be appreciated, the transmission may further include a countershaft (not shown) which would enable, with the addition of another gear, at least one of the four gear meshes in the transmission to be used as a reverse power path. For purposes of this disclosure, however, reference will be made to the various gear meshes with the understanding that one or more of the gear meshes may constitute a reverse gear mesh for the transmission 38.

The first gear mesh 43 includes meshing gears 50 and 52. As shown, gear 50 is freely rotatably mounted on the input shaft 39 while gear 52 turns with the output shaft 42 of the transmission 38.

The second gear mesh 44 includes meshing gears 54 and 56. As shown, gear 54 is freely rotatable about the input shaft 39 while gear 56 turns rotates with the output shaft 42 of the transmission 38.

The third gear mesh 46 includes meshing gears 58 and 60. As shown, gear 58 is freely rotatably mounted about the input shaft 39 while gear 60 turns with the output shaft 42 of the transmission 38.

The fourth gear mesh 48 includes a pair of meshing gears 62 and 64. As shown, gears 62 is freely rotatably mounted about the input shaft 39 while gear 64 turns with the output shaft 42 of the transmission 38.

Either of the gears 50, 54 can be coupled to the input shaft 39 for rotation therewith as through a conventional clutch mechanism 66. Suffice it to say, the clutch mechanism 66 includes a hub 68 that is secured to the input shaft 39 and an internally splined coupler 70 which couples the hub 68 alternatively to gear 50 or gear 54. The coupler 70 can be selectively moved into an engagement with either gears 50 or 54 by means of an actuator 72. In the illustrated embodiment, the actuator 72 includes a conventional endwise movable shift rail 74 that is movable in opposite directions from a neutral position into either of two speed ratio positions thereby conditioning the transmission 38 into a specific speed ratio.

Either of the gears 58, 62 can likewise be coupled to the input shaft 39 for rotation therewith as through another conventional clutch mechanism 76. Suffice to say, the clutch mechanism 76 includes a hub 78 secured to shaft 39 and an internally splined coupler 80 which couples the hub 78 alternatively to gear 58 or gear 62. The coupler 80 can be selectively moved into engagement with either of the gears 58 or 62 by means of an actuator 82. In the illustrated embodiment, the actuator 82 includes a conventional endwise movable shift rail 84 that is movable in opposite directions from a neutral position into either of two speed ratio positions thereby conditioning the transmission 38 into a specific speed ratio.

In the illustrated from of the invention, the shift rails 74, 84 are disposed in generally vertical alignment relative to each other. It should be appreciated, however, that the shift rails 74, 84 could be disposed in other than a generally vertical relation relative to each other without detracting or departing from the spirit and scope of the present invention.

Figure 4:
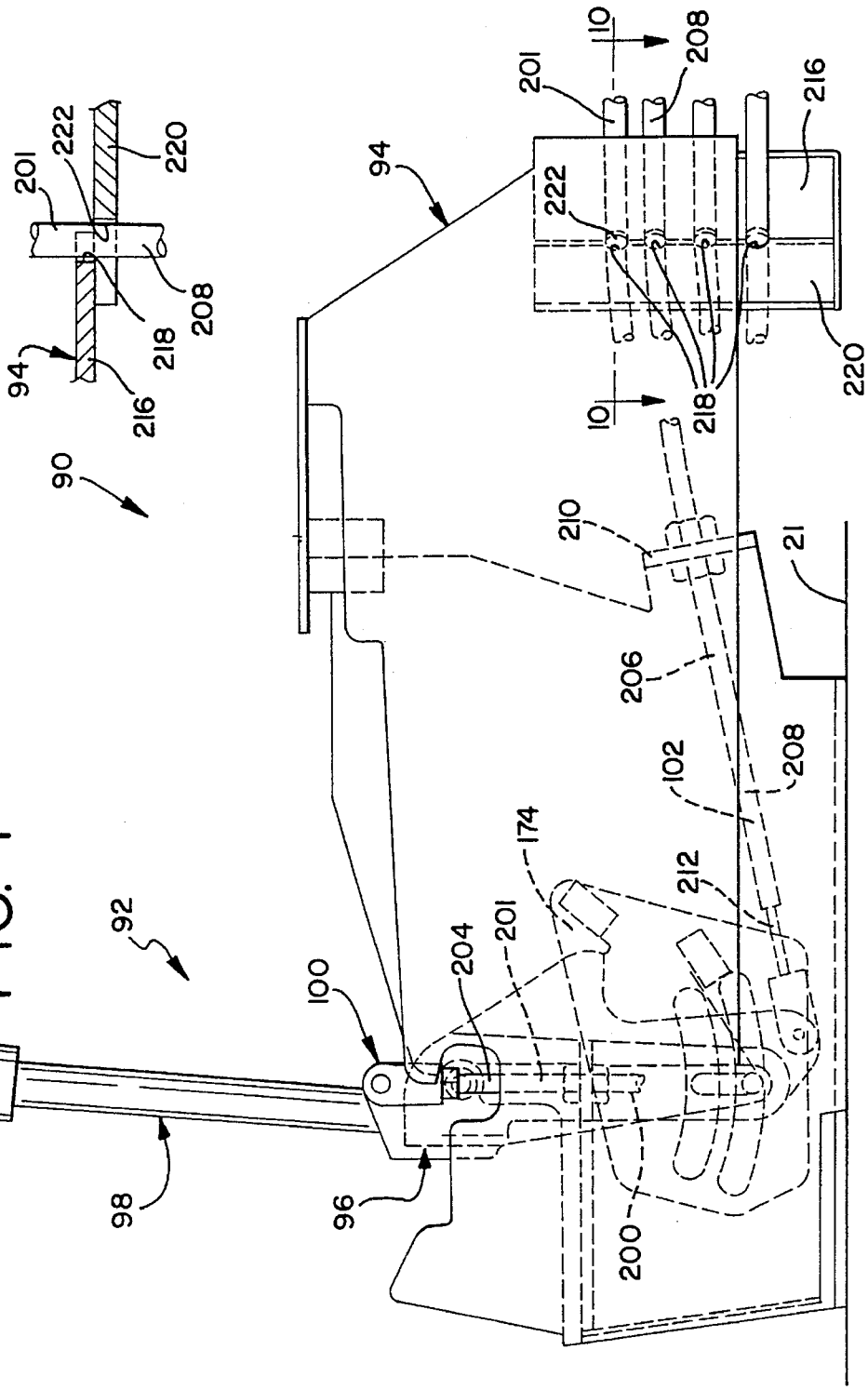
FIG. 4 is side elevational view of the modular in-line shifting mechanism of the present invention.

As shown in FIG. 4, a shift mechanism 90 is provided for selectively conditioning the transmission 38 (FIG. 3) into a selected gear ratio. The shift mechanism 90 includes a one-handed shifter assembly 92 that is connectable to the first and second actuators 72 and 82, respectively (FIG. 3), for manually conditioning the transmission into a selected speed ratio and that is mounted on a housing 94. Preferably, the shifter assembly 92 and housing 94 form a modular unit that can be assembled outside of and installed as a single assembly to the implement. Although illustrated in combination with an agricultural implement having an enclosed cab region 20, it should be appreciated that the present invention is equally applicable to other agricultural implements wherein space constraints are not necessarily of concern but where an in-line shifter mechanism such as that of the present invention could be used.

The shifter assembly 92 includes a manually movable shiftable controller 96 and a manually shiftable controller 98. The manually movable controller 96 is shiftable between forward and rearward positions along a monoplanar path of travel. The second movable controller 98 is preferably mounted on the controller 96 to promote one-handed operation of the shifter assembly 92. The controller 98 is vertically movable between two vertical positions.

A force transfer mechanism 100 connects the vertically movable controller 98 to a selected one of the actuators 72, 82 of the transmission 38. A second force transfer mechanism 102 connects the controller 96 to the selected one of the actuators chosen to be actuated. That is, the vertical position of the controller 98 selects which actuator 72, 82 is going to be operated while the fore-and-aft movements of controller 96 effects operation of the selected actuator thereby conditioning the transmission into a specific speed ratio.

Figure 5:
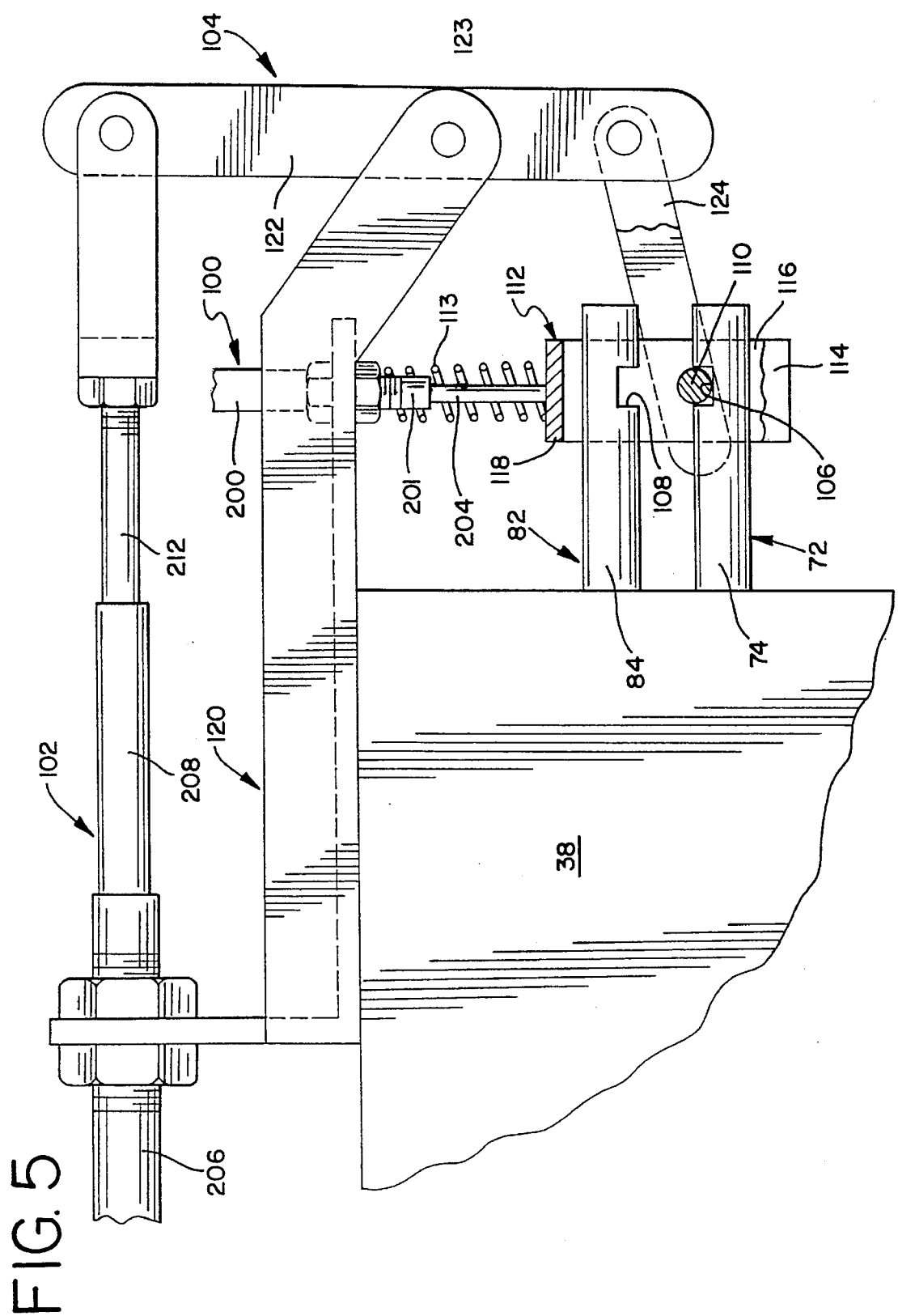
FIG. 5 is a schematic side view of a selector assembly that cooperates with and in response to the shifting mechanism for conditioning the transmission for operation.

As shown in FIG. 5, the force transfer mechanisms 100 and 102 are connected to the actuators 72 and 82 as through a conventional actuator selector assembly 104. As shown, shift rail 74 has a suitable notch or groove 106 provided on the outer surface thereof. Similarly, shift rail 84 has a suitable notch or groove 108 provided on the outer surface thereof and preferably in vertical confronting relation relative to the notch or groove 106 on shift rail 74. The actuator selector assembly 104 preferably includes a detent 110 that is normally releasably accommodated within the notch or groove 106 of shift rail 74. The detent or pin 110 is carried by a yoke 112 that, in the illustrated embodiment, is mounted for vertical displacement and is biased into position under the influence of a spring 113. Yoke 112 includes a pair of spaced depending arms 114 and 116 provided on opposite sides of the vertically aligned shift rails 74 and 84. The arms 114, 116 have opposite ends of the pin 110 secured thereto. A bight portion 118 of yoke 112 is connected to the force transfer mechanism 100 such that the position of detent 110 is responsive to vertical elevational movement of the controller 98.

The actuator selector assembly 104 further includes a mounting bracket 120 that is suitably secured to the transmission 38. A free end of the mounting bracket 120 carries a vertically arranged lever or arm 122 that is connected to the bracket 120 intermediate its ends for pivotal movement about pivot pin 123. A lower end of lever 122 is connected to the detent 110 as by a suitable articulated lever system 124. The opposite end of lever 122 is suitably connected to the force transfer mechanism 102 that responds to fore-and-aft pivotal movements of the controller 96.

As will be appreciated, vertical elevational movements of controller 98 will be transferred through the force transfer mechanism 100 into vertical elevational movements of the yoke 112 thereby selectively moving the detent 110 between engagement with the actuator 72 and the actuator 82 depending upon the vertical disposition of the controller 98. Moreover, the fore-and-aft movements of controller 96 will be transferred through the force transfer mechanism 102 thereby moving the lever 122 from the generally vertical position corresponding to a neutral position for the transmission and thereby moving the detent 110. Because detent 110 is removably accommodated within either notch 106 or 108 of one of the shift rails 74 or 84, respectively, the pivotal movement of the controller 96 will be transferred into endwise movement of the selected shift rail thereby moving the selected shift rail into a speed ratio position and thereby conditioning the transmission into a specific speed ratio.

Figure 6:
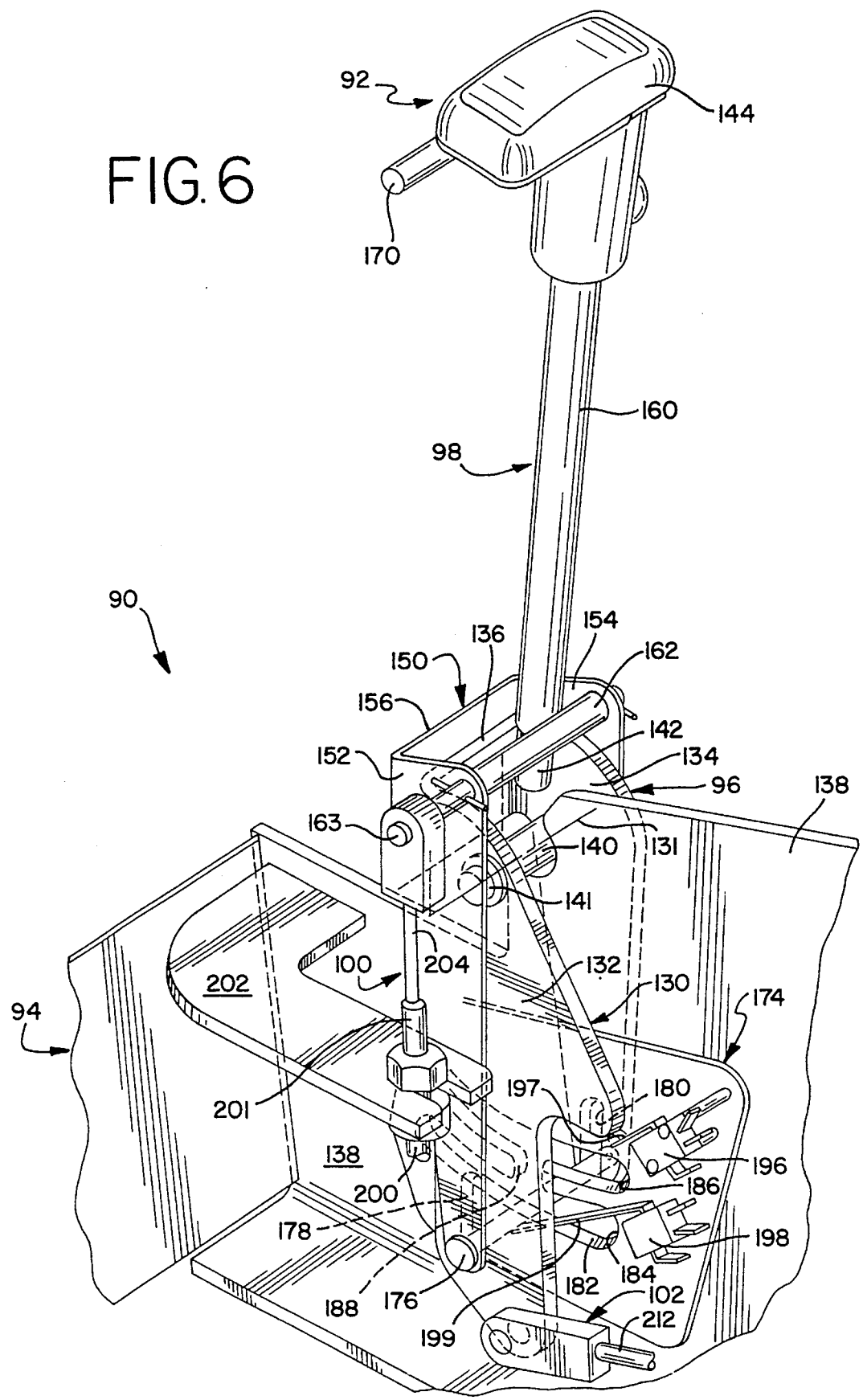
FIG. 6 is a perspective view of the present invention with parts being broken away to show details thereof.

As shown in FIGS. 6 and 7, controller 96 is preferably configured as a vertically elongated shift lever 130 that is mounted for fore-and-aft movement along a fixed fore-and-aft generally arcuate path of travel. The shift lever 130 is mounted intermediate its ends for pivotal movement about a fixed axis 131 extending generally normal to the length of the shift lever 130. In the illustrated form of the invention, the shift lever 130 has a generally U-shaped cross sectional configuration along the lower portion of its length and includes a pair of transversely spaced generally parallel legs 132 and 134 whose upper ends are rigidly joined to each other by a transverse web 136. The legs 132, 134 of the shift lever 130 straddle opposite sides of an upstanding vertical wall 138 forming part of housing 94. As shown, a hollow transverse bushing 140 is fixedly secured toward the upper end of wall 138 of housing 94. A pin 141 is pivotally accommodated for turning movement in the bushing 140 and defines the pivotal axis 131 for the shift lever 130. Opposite ends of pin 141 are suitably secured to the legs 132 and 134 of the shift lever 130. Notably, the lower end of leg 132 of shift lever 130 is connected to the force transfer mechanism 102 such that arcuate movements of the shift lever 130 about axis 131 from the neutral position shown results in movement of the force transfer mechanism 102.

The upper end of shift lever 130 extends vertically upward and away from the pivot pin 141 and is lengthwise sized to vertically extend into the cab region 20 of the implement. In a preferred form of the invention, a vertically elongated preferably cylindrical shaft 142 is secured to and extends upwardly from the legs 132, 134 of the shift lever 130. Preferably, a hollow cap 144 is secured to the upper free end of shaft 142.

The controller 98 is preferably configured as an elongated slide 150 that is mounted for movement with and for elevational movement along the shift lever 130. In the illustrated form of the invention, the slide 150 has a generally U-shaped cross-sectional configuration along the lower portion of its length and includes a pair of transversely spaced generally parallel legs 152 and 154 whose upper ends are rigidly joined to each other by a transverse web 156. Notably, the legs 152, 154 of slide 150 embrace and extend generally parallel to legs 132, 134, respectively, of shift lever 130.

The upper end of slide 150 includes a vertically elongated tube 160 having an inner diameter that generally corresponds to the outer diameter of the shaft portion 142 on shift lever 130. Accordingly, the slide 150 is configured to vertically slide along the length of shaft 142 of shift lever 130. In the illustrated form of the invention, the upper ends of the bifurcated legs 152, 154 of slide 150 have a transverse and hollow tube 162 transversely extending therebetween in generally normal relation to tube 160. Notably, robes 160 and 162 are fixedly secured to each other as by welding or the like. A pin 163 passes through tube 162 and is suitably secured to the legs 152 and 154 of slide 150 to prevent endwise displacement of pin 163.

Turning to FIG. 7, the free upper end of tube 160 is provided with a cap 164 through which shaft 142 of shift lever 130 endwise extends. As shown in FIG. 7, the free upper end of shaft 142 of shift lever 130 is secured within and is responsive to fore-and-aft movements of the hollow cap 144. Cap 144 defines a blind cavity 166 that opens to the bottom thereof. Cap 164 on tube 160 is mounted within the blind bore 166 thereby guiding slide 150 of controller 98 for endwise sliding movement between two extreme vertical positions.

As shown in FIG. 8, cap 144 of shift lever 130 is preferably configured with a vertical channel 168 which opens to the bottom of cap 144 and extends vertically along a portion thereof. A generally T-shaped actuator 170 is fixed to and extends radially outward frown tube 160 of slide 150 and has a portion thereof guided for vertical movement within channel 168. As will be appreciated, the actuator 170 is disposed in proximate relation to the upper end of cap 144 so that the operator is required to use only one hand to both move the shift lever 130 of controller 96 in fore-and-aft directions along its monoplanar path of travel as well as vertically move the slide 150 of controller 98 when so desired.

Returning to FIG. 6, the free end of pin 163 on slide 150 extends transversely beyond the leg 152. The free end of pin 163 is connected to the force transfer mechanism 100. As such, endwise vertical movement of the slide 150 imparts movements to the force transfer mechanism 100 thereby selecting which actuator 72, 82 is to be selected for shifting movement.

It will be understood from the above that conditioning of the transmission 38 results frown combined position of the controllers 96 and 98. In the illustrated form of the invention, the elevational position of controller 98 selects which actuator 72, 82 is to be moved while fore-and-aft positional shifting movements of controller 96 selects the speed ratio position for the selected actuator thereby conditioning the transmission for specific speed ratio operation.

As shown in FIGS. 6 and 7, movement of the controllers 96 and 98 is restricted by a shift gate 174, defining a shift pattern therein. In the illustrated form of the invention, the shift gate 174 is arranged on wall 138 of housing 94 and between the bifurcated legs 132, 134 and 152, 154 of shift lever 130 and slide 150, respectively, in a generally vertical disposition. As shown, opposite ends of a pin 176 are fixed between a lower end of the legs 152, 154 of slide 150. Pin 176 likewise passes through a lower portion of legs 132, 134 of the shift lever 130. The legs 132, 134 of shift lever 130 are provided with aligned and generally vertical slots 178 and 180, respectively, which prevents sideways movement of pin 176 when shift lever 130 is rocked about axis 131 while permitting free vertical movement of the pin 176 when slide 150 of controller 98 is elevationally moved from one extreme vertical position to another.

The shift pattern in gate 174 is defined by a compound slot 182 that has a generally H-shaped configuration. As shown, the compound slot 182 has a closed margin defined by the shift gate 174. The compound slot 182 through which pin 176 extends and that is defined by gate 174 includes a pair of generally parallel vertically spaced horizontally elongated slots 184 and 186, that are joined to each other by a generally vertical slot 188. The slots 184 and 186 have a generally arcuate configuration with the radial center thereof being generally located at the rock axis 131 of the shift lever 130. As will be appreciated, the elongated horizontal configuration of slots 184 and 186 permits back and forth rocking movement of the shift lever 130 while the vertical slot 188 permits vertical movement of the slide 150. As is conventional, each actuator 72, 82 has a neutral position wherein neither speed ratio condition affected by the respective actuator will be effected. In the illustrated form of the invention, the vertical slot 188 in the shift pattern of the shift gate 174 represents the neutral position for the actuators 72, 82.

Figure 9:
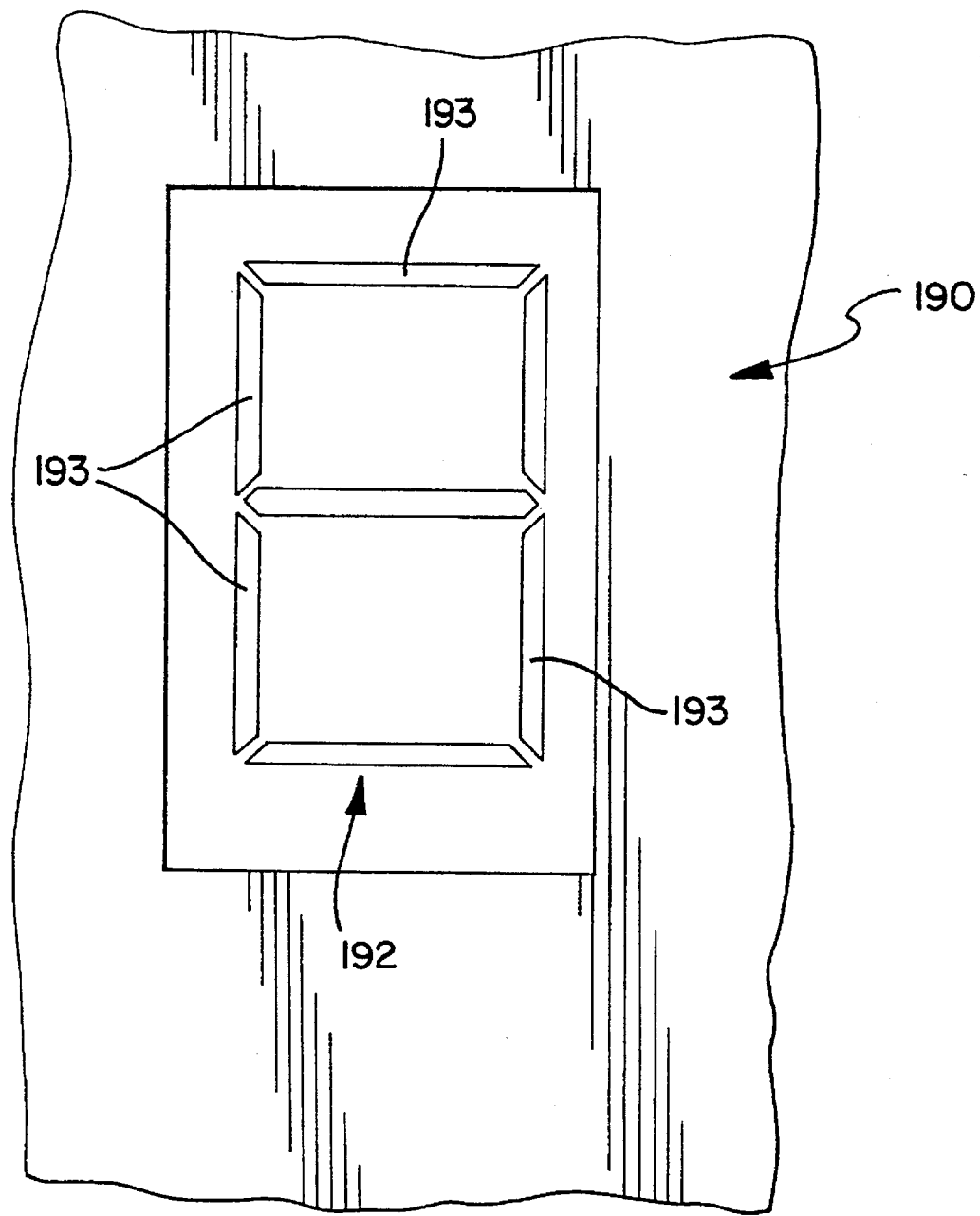
FIG. 9 is a schematic representation of one form of display preferably used in combination with the shifting mechanism of the present invention.

With the shift lever 130 being movable along only a monoplanar path of travel, the operator will necessarily move the shift lever 130 at least twice into at least one of its forward and rearward positions to effect two different speed ratio conditions for the transmission 38. Moving the shift lever 130 twice into identical fore-or-aft positions to effect two different speed ratio conditions for the transmission sometimes can make it difficult to visibly evaluate in the current operating condition of the transmission. Accordingly, and as shown in FIG. 9, the shift mechanism of the present invention is further provided with an electrical display 190. The purpose of the electrical display 190 is to provide a visual indication to the operator in which specific speed ratio the transmission is conditioned.

The display 190 can take a myriad of different shapes and forms. In a preferred form, the electronic display 190 is located in the cab region 20 of the implement and includes an alphanumeric panel 192 for visually indicating in which speed ratio condition the transmission is currently engaged. The panel 192 is preferably comprised of a series of illuminable elements 193 arranged in a predetermined pattern relative to each other. The display 190 operates in response to output signals received frown sensors 196 and 198 (FIG. 7) that monitor the position of the controllers 96 and 98, respectively, and operate in combination with simple and well known logic circuitry. In the illustrated form of the invention, the sensors 196 and 198 are suitably mounted on the shift gate 174. As shown, sensor 196 includes a switch arm 197 that monitors the back and forth movements of the shift lever 130 controller 96. Likewise, sensor 198 includes a switch arm 199 that monitors the elevational position of the slide 150 of controller 98.

As will be appreciated by those skilled in the art, agricultural implements such as cotton harvesters and combines are replete with various movable mechanisms for effecting operation of a myriad of various sub-assemblies. Parts of such subassemblies often lie and/or extend between the shifter assembly 92 and the transmission 38. To simplify the structure, overall routing, and transfer of motion and force between the shifter assembly 92 and the transmission 48, the force transfer mechanism 100 preferably comprises a conventional push/pull cable 200.

As shown in FIGS. 6 and 7, the push/pull cable 200 includes an outer cable 201, having one end secured to a generally horizontal bracket 202 which is provided as part of housing 94. Bracket 202 includes an open sided channel at a free end thereof for accommodating and having fixedly secured thereto a free end of the outer cable 201. An inner cable 204 extends from the outer cable 201 and is suitably connected to pin 163 on the slide 150. As shown in FIG. 5, the opposite end of the outer cable 201 is secured to bracket 120 of actuator selector assembly 104. The other free end of the inner cable 204 is suitably attached to the yoke 112 of the actuator selector assembly 104. Accordingly, upon vertical displacement of the controller 98, the yoke 112 and the detent 110 carried thereby are simultaneously vertically displaced thereby selectively moving the detent 110 between grooves 106 and 108 defined on the shift rails 74 and 84, respectively.

The force transfer mechanism 102 likewise preferably comprises a push/pull cable 206. As shown in FIG. 4, the push/pull cable 206 associated with controller 96 includes an outer cable 208 having one end secured to a bracket 210 provided as part of housing 94. An inner cable 212 horizontally extends from the outer cable 208 and is articulately connected to the lowermost end of the shift lever 130 and, more specifically, to the lowermost end of leg 132 of shift lever 130. As shown in FIG. 5, the opposite end of the outer cable 208 is secured to bracket 120 of the actuator selector assembly 104. The other free end of the inner cable 212 is suitably attached to the upper end of lever 122. By such design, fore-and-aft rocking movements of the shift lever 130 will result in pivotal movement of the lever 122 about pin 123 thereby resulting in endwise displacement of the selected shift rail 74, 84.

Intermediate their ends, the outer cables 201 and 208 of the force transfer mechanisms 100 and 102, respectively, pass through the housing 94. As shown in FIGS. 4 and 10, the housing 94 is provided with an upright panel 216 having a series of vertically spaced open-sided generally U-shaped channels 218. As shown, a bulkhead plate 220 cooperates with panel 216 in entrapping the outer cables 201 and 208 of the force transfer mechanisms 100 and 102, respectively, to the housing 94. As shown, plate 220 likewise includes a series of open-sided generally U-shaped channels 222. The channels 222 are vertically spaced apart from each other in the same vertical spacing arrangement as are channels 218 on panel 216. As will be understood, the combined configuration of the channels 218, 222 on panel 216 and plate 220, respectively, define a series of apertures through which the outer cables 201 and 208 of the force transfer mechanisms 100 and 102, respectively, extend. After passing the cables 200 and 206 therethrough, plate 220 is secured to the housing 94 thereby securing the cables 200 and 206 in place. The additional slots in the housing allow additional cables and/or electrical conduits to pass from the housing while inhibiting debris from entering into the housing 94.

An advantage of the present invention is that the shifter assembly 92 can be assembled to the housing 94 outside of the cab region 20 of the implement. The shift lever 130 is assembled to the housing 94 by passing pivot pin 141 through the bushing 140 thereby mounting controller 96 for rocking back-and-forth movement in a monoplanar path of travel about axis 131. The slide 150 of controller 98 is carried by and for movement with the shift lever 130. Once mounted on lever 130, the slide 150 can elevationally move along the length of shaft 142 of shift lever 130. Once the shifter assembly 92 is mounted to the housing 94, the free ends of cables 200 and 206 are connected to their respective controllers 98 and 96, respectively, and the opposite ends of the cables 200 and 206 extend through the housing 94. Thereafter, the shifter assembly 92 and housing 94 can be assembled to the implement as a modular unit or assembly.

In a preferred form of the invention, a thick foam gasket (not shown) is adhered to the cab wall adjacent to that wall of the housing 94 through which the cables 200 and 206 extend. Once the housing 94 is installed in the cab 20, the bulkhead plate 220 is sealed against the gasket thereby inhibiting foreign debris from entering into the housing 94. Thereafter, the force transfer mechanisms 100 and 102 are connected to the actuators 72 and 82.

In the illustrated form of the invention, the free end of the force transfer mechanism 102 extends from housing 94 and is connected to the vertically elongated lever 122 of the actuator selector assembly 104. The free end of the force transfer mechanism 100 extends from the housing 94 and is connected to the yoke 112 of the actuator selector assembly 104.

Once the shift mechanism 92 is installed in the implement, the force transfer mechanisms 100 and 102 serve to interconnect the shifter assembly 92 to the transmission actuators 72 and 82. In the illustrated embodiment, the push/pull cables 200 and 206 operatively interconnect the shifter assembly 92 to the transmission actuators 72, 82. Although push/pull cables 200 and 206 are illustrated to transfer motion and force between the shifter assembly 92 and the actuators 72, 82, it will be appreciated that it is within the spirit of the scope of the present invention to utilize force transfer mechanisms other than push/pull cables for transferring motion and force between the shifter assembly 92 and the transmission actuator 72, 82.

A mode of operation of the shifter assembly 92 will now be discussed to provide a full and complete understanding of the present invention. In FIG. 7, the controllers 96 and 98 are illustrated in a neutral position. Of course, the neutral position of the controllers 96 and 98 corresponds to a neutral condition for the transmission. To condition the transmission 38 into a first speed ratio, the shift lever 130 is pivoted forwardly about pivot pin 141 by manually moving cap 144. As the shift lever 130 moves forwardly, pin 176 slides rearwardly through slot 184. The end of slot 184 acts as a limit stop for preventing excessive pivotal movement of the shift lever 130.

As seen in FIG. 5, the force transfer mechanism 102 responds to the forward movement of the controller 96 and imparts pivotal movement to lever 122 about pin 123. As mentioned above, detent 110 is normally engaged in slot 106 of shift rail 74. When lever 122 is pivoted about pin 123 in response to forward pivotal movement of the shift lever 130, the pivotal movement of lever 122 is transmuted into endwise movement of the shift rail 74. As shown in FIG. 3, such endwise movement of the shift rail 74 causes the coupling 70 to conjointly engage hub 68 and gear 50 of the first gear mesh 43 thereby establishing a first power path through the transmission.

To condition the transmission 38 into a second speed ratio, the shift lever 130 is pivoted rearwardly about pivot pin 141. As the shift lever 130 moves rearwardly, pin 176 slides forwardly through slot 184. The opposite end of slot 184 acts as a limit stop for preventing excessive movement of the shift lever 130. As will be appreciated, as the shift lever 130 is moved to condition the transmission between two different speed ratios, the controller 96 passes through a neutral condition which corresponds to a neutral condition for the transmission.

As seen in FIG. 5, the force transfer mechanism 102 responds to the rearward shifting movement of the controller 96 and imparts pivotal movement to the lever 122 about pin 123. When the shift lever 130 is moved in its monoplanar path of travel between first and second positions, the detent 110 remains engaged in groove 106 of shift rail 74. Thus, when lever 122 is pivoted about pin 123, the pivotal movement of the lever 130 is transmuted into endwise movement of the shift rail 74. As shown in FIG. 3, such endwise movement of the shift rail 74 causes the coupling 70 to disengage from gear 50 and conjointly engage the hub 68 with gear 54 of the second gear mesh 44 to establish a second power path through the transmission 32.

Figure 11:
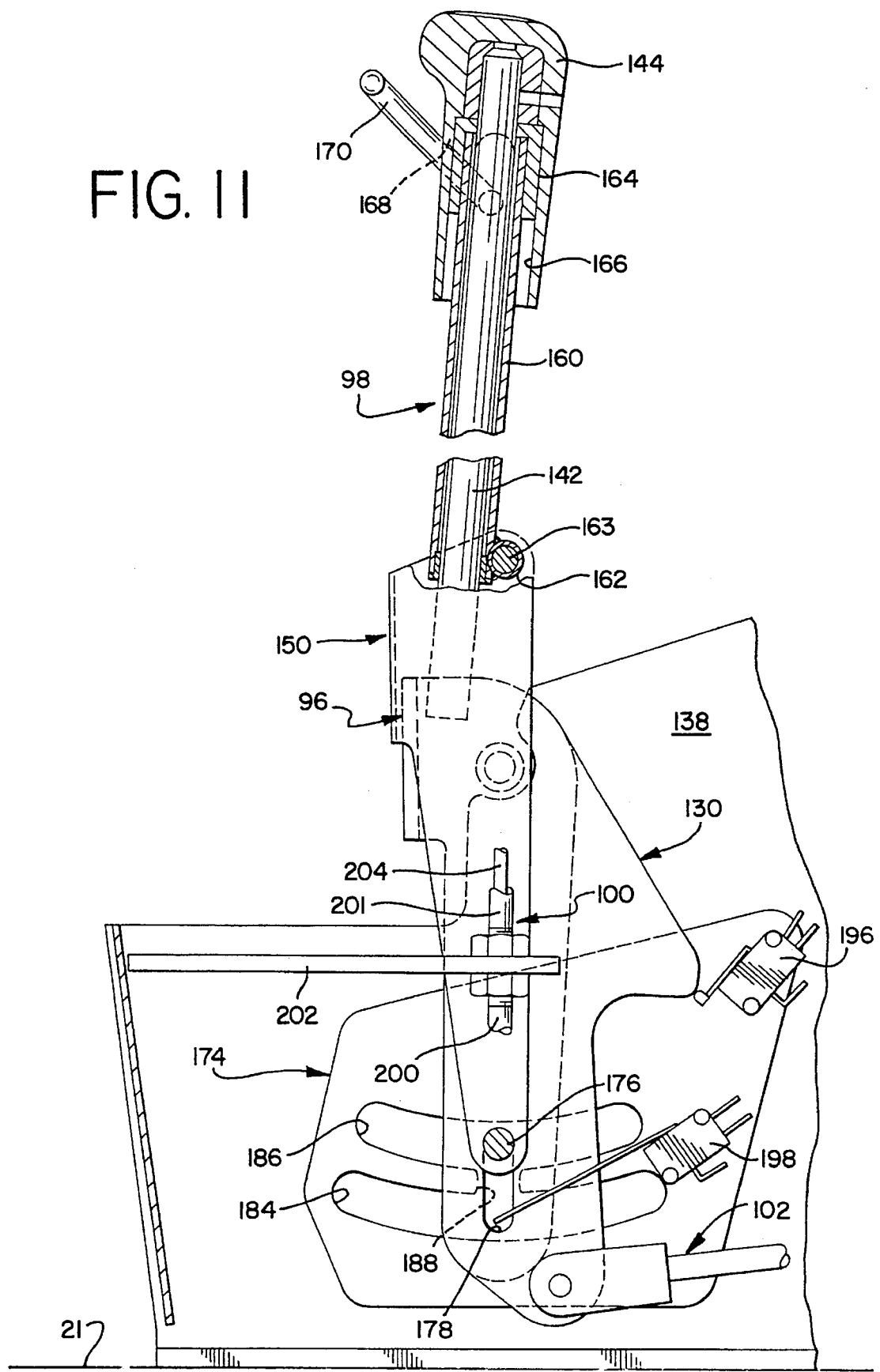
FIG. 11 is a view substantially similar to FIG. 7 but showing the shift mechanism of the present invention in a second position for effecting the speed ratio condition for the transmission.

To condition the transmission 38 into a third speed ratio, controller 96 is brought into a neutral position. As shown in FIGS. 7 and 11, when the shift lever 130 of controller 96 is in a neutral position, pin 176 is aligned with the vertical slot 188 in the shift gate 174. Alignment between pin 176 and slot 188 allows vertical displacement of controller 98 thereby shifting pin 176 from slot 184 to slot 186.

In the illustrated embodiment of the invention, vertical displacement of the controller 98 is effected by pulling upward on the actuator 170. Pulling upward on the actuator 170 causes the slide 150 of controller 98 to move along a lengthwise portion of shift lever 130. As the actuator 170 is pulled up, cap 164 is guided within the blind cavity 166 defined by cap 144 as shown in FIG. 11. Vertical displacement of controller 98 is limited by the abutment of cap 164 with cap 144. As will be appreciated, and as shown in FIG. 8, the open channel 168 in the cap 144 furthermore vertically guides and limits the upward movement of the actuator 170. Notably, the vertically elongated slots 178 and 180 in the shift lever 130 permit free elevational movement of the pin 176 along with the controller 98.

As the slide 150 is elevationally moved into the position shown in FIG. 11, the pin 163 moves elevationally therewith. The force transfer mechanism 100 responds to elevational movement of the controller 98 and, more specifically, to the elevational movement of pin 163. As mentioned before, the elevational position of the controller 98 selects which actuator 72, 82 is to be moved by the controller 96. In the illustrated embodiment, elevational movement of the controller 98 from the position shown in FIG. 7 to the position shown in FIG. 11 results in vertical displacement of the yoke 112 of the actuator selector assembly 104 against the action of spring 113. As will be appreciated from FIG. 5, vertical displacement of the yoke 112 from the position shown causes the detent 110 to move from groove 106 on actuator 72 to groove 108 on actuator 82. Notably, however, the transmission 38 must be in a neutral condition to enable movement of the detent 110 between grooves 106 and 108.

When the detent is accommodated within groove 108 of actuator 82, the subsequent fore-and-aft shifting movement of the shift lever 130 will result in movement of the actuator 82 from a neutral position into either of two speed ratio positions. That is, if the shift lever 130 is pivoted forwardly the force transfer mechanism 102 responds thereto and imparts pivotal movement to the lever 122 about pin 123. The pivotal movement of lever 122 about pin 123 is translated into endwise movement of the shift rail 84 in a manner causing the coupling 80 to conjointly engage both hub 78 and gear 58 of gear mesh 46 thereby establishing a third power path through the transmission.

Alternatively, when the shift lever 130 is moved or shifted rearwardly about the pivotal axis 131, such movement is translated into pivotal movement of the lever 122 by the force transfer mechanism 102. Accordingly, the shift rail 84 will be moved whereby moving the coupling 80 away from gear 58 and thereby conjointly engaging hub 78 and gear 62 of gear mesh 48 thereby establishing a fourth power path through the transmission.

Since the controller 98 is movable only along a monoplanar path of travel and can be positioned in either of two speed ratio positions in at least a forward or reverse position of the shift lever 130, the display indicator 190 is provided in the cab region 20 of the implement for providing a visual indication of in which speed ratio condition the transmission is currently conditioned. The display 190 is controlled by the sensors 196 and 198 which detect the relative positions of the controllers 96 and 98. In a most preferred form of the invention, sensors 196 and 198 are connected to circuitry (not shown) which is carried within the confines of housing 94.

Although the present invention should not be limited to enclosed environments, the monoplanar movement of the shift lever 130 is particularly suited to close or tight space constraints such as in the cab region 20 of an off-highway implement. Because the shifter assembly 92 has no side-to-side movement, it can be located closely adjacent to a side wall 24 of the cab 20 and move in a path of travel that extends generally parallel to the side wall 24 of the cab 20. Moreover, the shifter assembly 92 of the present invention readily lends itself to one-handed operation. That is, the shift lever 130 is readily movable in a fore-and-aft path of movement as through movement of cap 144 while the actuator 170 for moving the second controller 98 is closely proximate to the cap 144 of shift lever 130 thereby promoting one-handed operation of both controllers 96 and 98.

Another advantage of the present invention relates to the modular nature thereof. The shifter assembly 92 can be assembled to the housing 94 outside of the cab region and thereafter installed into the cab region of the harvester. As such, the force transfer mechanisms 100 and 102 can be connected to the shifter assembly 92 and the free ends of such mechanisms can be subsequently connected to the actuators 72, 82 on the transmission 38 following its installation into the cab region 20 of the implement 10. Advantageously, the circuitry associated with the display 190 can be installed as part of a modular assembly. In this regard, the housing 94 is designed to inhibit debris and other contaminants from interfering with proper operation of the shifter mechanism. The channels 218 and 222 defined on panel 216 and bulkhead plate 220 serve to clamp the cables 200 and 206 leading from the housing 94 and thereby limit the amount of debris that can be introduced into the housing 94.

Unlike other shifter mechanisms, the elevational position of the controller 98 selects which actuator is to be operated in response to fore-and-aft shifting movements of the shift lever 130. Notably, however, selection of which actuator 72, 82 is to be moved is influenced only through vertical movement of the controller 98 while allowing controller 96 to remain substantially stationary and does not require rocking movement of the shift lever 130 to effect such ends.

Frown the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A shift mechanism for a multi-speed ratio transmission of an off-highway implement, said transmission having a plurality of gear meshes capable of developing a plurality of speed ratios between an input and an output of the transmission, a first actuator associated with first and second gear meshes of the transmission and having at least two speed ratio positions, and a second actuator associated with a third gear mesh of the transmission and having at least a third speed ratio position, each speed ratio position of the actuators being effective to condition the transmission into a different speed ratio, said shift mechanism comprising:

a shifter assembly connectable to said first and second actuators for manually conditioning said transmission into a selected speed ratio, said shifter assembly comprising a first manually movable controller mounted for rocking fore-and-aft movement about a fixed axis between forward and rearward positions along a monoplanar path of travel, said first controller including a vertically elongated shift lever which, for a major portion of its length, mounts and coaxially guides a strand manually movable controller for vertical telescopic movement therealong, said second controller being vertically movable along an upper lengthwise portion of said shift lever between two different vertical positions, said second controller being selectively connected to one of said actuators through a first force transfer mechanism, said first force transfer mechanism being responsive to the vertical position of the second controller, and wherein said first controller is connected to the selected one of said actuators through a second force transfer mechanism that is connected and responsive to said first controller such that movement of said first controller moves the selected one of said actuators into a speed ratio position thereby conditioning the transmission into a selected speed ratio.

2. The shift mechanism according to claim 1 wherein as said first manually movable first controller passes between said forward and reverse positions, said controller passes through a neutral position which corresponds to a neutral position for said actuators.

3. The shift mechanism according to claim 1 wherein said second controller includes a slide that vertically moves along a lengthwise portion of said shift lever and has a pin arranged toward a lower end thereof for movement therewith, and wherein said shifter assembly further includes a shift gate arranged in a generally vertical disposition, said shift gate defining a shift pattern having a closed margin entrapping movement of said pin therein and which limits movements of said first and second controllers.

4. The shift mechanism according to claim 3 wherein each of said actuators has a neutral position, and wherein the shift pattern defined by said shift gate includes a neutral position for said first and second controllers and which corresponds to the neutral position of said actuators.

5. A shift mechanism for a multi-speed ratio transmission for an off-highway implement, said transmission having a plurality of gear meshes capable of developing a plurality of speed ratios between an input and an output of the transmission, a first actuator associated with first and second gear meshes of the transmission and having at least two speed ratio positions, and a second actuator associated with a third gear mesh of the transmission and having at least a third speed ratio position, each speed ratio position of the actuators being effective to condition the transmission into a different speed ratio, said shift mechanism comprising:

a shifter assembly connectable to said first and second actuators for manually conditioning said transmission into a selected speed ratio, said shifter assembly comprising a manually movable controller mounted for vertical movement between upper and lower positions along a predetermined path of vertical travel and a manually shiftable controller on and about which said manually movable controller is coaxially mounted for vertical telescoping movement along a major lengthwise portion of said manually shiftable controller, said manually shiftable controller being pivotally movable between forward and rearward positions, said controllers being connected to said first and second actuators through first and second motion transfer mechanisms, respectively, such that vertical telescoping movements of said manually movable controller along its predetermined path of travel between said positions selects which actuator is to be moved while movements of said manually shiftable controller effects movement of the selected actuator into a speed ratio position thereby conditioning the transmission into a specific speed ratio.

6. The shift mechanism according to claim 5 wherein said manually movable controller is mounted adjacent a free-end of and to the second controller such that the first controller is movable relative to the second controller using only one hand by the operator.

7. The shift mechanism according to claim 5 wherein said manually movable controller comprises an elongated slide having an upper end disposed for manual engagement and a lower end which carries a pin which passes through a shift gate for influencing vertical movement of said manually shiftable controller.

8. The shift mechanism according to claim 7 wherein said shift gate defines a generally vertical H-shaped shift pattern through which the pin of said manually movable controller passes thereby limiting movement of said manually shiftable controller.

9. The shift mechanism according to claim 7 wherein each of said actuators further includes a neutral position, and wherein the shift pattern defined by said shift gate includes a neutral range for said controllers which corresponds to the neutral position of said actuators.

10. The shift mechanism according to claim 5 wherein as said manually shiftable controller moves between forward and rearward positions said manually shiftable controller passes through a neutral position which corresponds to a neutral position for said actuators.

11. The shift mechanism according to claim 5 wherein said shifter assembly further includes a generally vertical shift gate that limits movements of said controllers through predetermined ranges of movement.

12. The shift mechanism according to claim 5 further including an actuator selector assembly disposed between said actuators and that is responsive to the movements of the shifter assembly, said actuator selector assembly being responsive to vertical movements of said manually movable controller whereby when said manually movable controller is in one position said shifter assembly is connected to one actuator and when said manually movable controller is moved to a second position said selector assembly connects the shifter assembly to the other actuator.

13. The shift mechanism according to claim 12 wherein said selector assembly is responsive to forward and rearward movements of said manually shiftable controller thereby moving the selected actuator forward and rearward in directions corresponding to movements of the manually shiftable controller.

14. A shift mechanism for a multi-speed ratio transmission for an off-highway implement, said transmission having a plurality of gear meshes capable of developing a plurality of speed ratios between an input and an output of the transmission, a first actuator associated with first and second gear meshes of the transmission and having at least two speed ratio positions, and a second actuator associated with a third gear mesh of the transmission and having at least a third speed ratio position, each speed ratio position of the actuators being effective to condition the transmission into a different speed ratio, said shift mechanism comprising:

a shifter assembly connectable to said first and second actuators for manually conditioning said transmission into a selected speed ratio, said shifter assembly comprising a manually movable controller mounted for vertical movement between upper and lower positions along a predetermined path of vertical travel and a manually shiftable controller, said manually movable controller including an elongated slide mounted on said manually shiftable controller and having an upper end disposed for manual engagement and a lower end which carries a pin which passes through a shift gate for influencing vertical movement of said manually movable controller, said manually shiftable controller being movable between forward and rearward positions, and wherein said manually shiftable controller comprises an elongated shift lever which, toward an upper end, guides said elongated slide of the manually movable controller for endwise vertical movement and that has a vertical slot at a lower end thereof for accommodating the passage of said pin therethrough, said controllers being connected to said first and second actuators through first and second motion transfer mechanisms, respectively, such that vertical positioning movements of said manually movable controller along its predetermined path of travel between positions selects which actuator is to be moved while movement of said manually shiftable controller effects movements of the selected actuator into a speed ratio position thereby conditioning the transmission into a specific speed ratio.

15. The shift mechanism according to claim 14 wherein the elongated shift lever of said manually shiftable controller is pivotally mounted to a housing intermediate opposite ends thereof for movement about a fixed axis.

16. A shift mechanism for an off-highway implement including a work station and a transmission having a plurality of gear meshes, each transmission gear mesh providing a specific gear ratio between an input and an output of the transmission, said transmission further including a first actuator associated with first and second gear meshes and that is movable from a neutral position to either of at least two gear ratio positions, and a second actuator associated with at least a third gear mesh and that is movable from a neutral position to at least a third gear ratio position, said shift mechanism comprising:

a modular assembly which can be preassembled and subsequently mounted at the work station of the implement, said modular assembly comprising a shifter assembly that is connectable to said first and second actuators for allowing the transmission to be manually conditioned into a selected speed ratio, said shifter assembly including a manually movable controller mounted for vertical movement between upper and lower positions along a predetermined vertical path of travel and a manually shiftable controller mounted for movement between forward and rearward positions, said manually shiftable controller including a vertically elongated shift lever about which said manually movable controller vertically and telescopically moves between said positions under the influence of an operator, said controllers being connected to said first and second actuators through first and second force transfer mechanisms, respectively, such that vertical positioning movements of said manually movable controller along its predetermined path of travel selects which actuator is to be moved while movements of said manually shiftable controller effects movements of the actuator into a speed ratio position thereby conditioning the transmission into a specific speed ratio, with said manually movable controller being pivotally mounted intermediate opposite ends thereof to a walled housing, said housing being configured such that the housing and the shifter assembly are mounted at the work station as a modular assembly.

17. The shift mechanism according to claim 16 wherein said manually shiftable controller comprises an elongated slide having an upper portion that is mounted such that the manually movable controller is movable relative to said manually shiftable controller using only one hand of an operator.

18. The shift mechanism according to claim 17 wherein a lower end of said slide is provided with a pin that projects through a gate defining a shift pattern thereon.

19. The shift mechanism according to claim 18 wherein the shift pattern defined by said gate includes a pair of generally parallel vertically spaced slots through which said pin extends, the slots permitting back and forth movements of said manually shiftable controller to effect changes in the speed ratios of the transmission, with said slots being joined to each other by a generally vertical slot to permit the pin to vertically move between the slots while permitting vertical movements of the manually movable controller to effect which actuator is moved by said shifter assembly.

20. A shift mechanism for an off-highway implement including a work station and a transmission having a plurality of gear meshes, each transmission gear mesh providing a specific gear ratio between an input and an output of the transmission, said transmission further including a first actuator associated with first and second gear meshes and that is movable from a neutral position to either of at least two gear ratio positions, and a second actuator associated with at least a third gear mesh and that is movable from a neutral position to at least a third gear ratio position, said shift mechanism comprising:

a modular assembly which can be preassembled and subsequently mounted at the work station of the implement, said modular assembly comprising a shifter assembly that is connectable to said first and second actuators for allowing the transmission to be manually conditioned into a selected speed ratio, said shifter assembly including a manually movable controller mounted for vertical movement between upper and lower positions along a predetermined vertical path of travel and a manually shiftable controller mounted for movement between forward and rearward positions, said manually movable controller comprising an elongated slide having an upper portion that is mounted for telescoping movements relative to said manually shiftable controller, with said manually shiftable controller comprising an elongated shift lever pivotally mounted intermediate its ends on a housing, and wherein said controllers are connected to said first and second actuators through first and second force transfer mechanisms, respectively, such that vertical positioning movements of said manually movable controller along its predetermined path of travel selects which actuator is to be moved while movements of said manually shiftable controller effects movements of the actuator into a speed ratio position thereby conditioning the transmission into a specific speed ratio, and wherein said housing on which said manually shiftable controller is mounted is configured such that the housing and the shifter assembly are mounted at the work station as a modular assembly.

21. A shift mechanism for an off-highway implement including a work station and a transmission having a plurality of gear meshes, each transmission gear mesh providing a specific gear ratio between an input and an output of the transmission, said transmission further including a first actuator associated with first and second gear meshes and that is movable from a neutral position to either of at least two gear ratio positions, and a second actuator associated with at least a third gear mesh and that is movable from a neutral position to at least a third gear ratio position; said shift mechanism comprising:

a modular assembly which can be preassembled and subsequently mounted at the work station of the implement, said modular assembly comprising a shifter assembly that is connectable to said first and second actuators for allowing the transmission to be manually conditioned into a selected speed ratio, said shifter assembly including a manually movable controller mounted for vertical movement between upper and lower positions along a predetermined vertical path of travel and a manually shiftable controller mounted for movement between forward and rearward positions, said manually shiftable controller including a vertically elongated shift lever about which said manually movable controller vertically and telescopically moves between said positions under the influence of an operator, and wherein said manually shiftable controller is twice moved into at least one of said forward and rearward positions to effect two different speed ratio conditions for the transmission, said controllers being connected to said first and second actuators through first and second force transfer mechanisms, respectively, such that vertical positioning movements of said manually movable controller along its predetermined path of travel selects which actuator is to be moved while movements of said manually shiftable controller effects movements of the actuator into a speed ratio position thereby conditioning the transmission into a specific speed ratio, and a walled housing on which said manually shiftable controller is pivotally mounted, said housing being configured such that the housing and the shifter assembly are mounted at the work station as a modular assembly, and wherein said shift mechanism further includes a display for visually indicating which speed ratio condition has been selected for the transmission.

22. The shift mechanism according to claim 21 wherein said display is operative in response to signals received from sensors that sense the positions of said controllers relative to said neutral position for the transmission.

23. A shift mechanism for an off-highway implement having an enclosed cab region, said cab region including vertically disposed front and rear walls which are joined to each other by vertical side walls, a floor and a roof, said implement being movable under the influence of a power train assembly including a self-propelled engine connected to a multi-speed transmission having a plurality of gear meshes, each transmission gear mesh providing a specific speed ratio between input and output ends of the transmission, said transmission further including a first shift rail assembly connected to first and second gear meshes of the transmission and having first and second gear ratio positions and a second shift rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller mounted for sliding movement between upper and lower positions along a predetermined generally vertical path of travel and a manually shiftable controller, said manually shiftable controller having a vertically elongated shift lever on which said manually movable controller is coaxially guided for a major portion of the length of said manually shiftable controller such that said manually movable controller is slidably mounted for generally vertical telescoping movement, said manually shiftable controller being mounted for rocking movement between forward and rearward positions along a monoplanar path of travel extending generally parallel to and adjacent one of the side walls of the cab enclosure, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift rail assembly into a speed ratio position thereby conditioning the transmission into a specific speed ratio.

24. The shift mechanism according to claim 23 wherein said manually movable controller has an upper end disposed in the cab region of the implement for manual engagement and has a lower end which carries a pin that passes through a gate having a shift pattern defined therein that controls vertical movement of said manually movable controller.

25. The shift mechanism according to claim 24 wherein the shift pattern defined by said gate includes a pair of generally parallel vertically spaced elongated slots and a vertical slot that joins said elongated slots in a generally H-shape pattern, the elongated slots permitting back and forth movements of the manually shiftable controller to effect changes in the speed ratios of the transmission and with the vertical slot in the gate allowing for vertical movement of the manually movable controller thereby allowing manual selection of which actuator is to be moved in response to back and forth movements of the manually shiftable controller.

26. A shift mechanism for an off-highway implement having an enclosed cab region, said cab region including vertically disposed front and rear walls which are joined to each other by vertical side walls, a floor and a roof, said implement being movable under the influence of a power train assembly including a self-propelled engine connected to a multi-speed transmission having a plurality of gear meshes, each transmission gear mesh providing a specific speed ratio between input and output ends of the transmission, said transmission further including a first shift rail assembly connected to first and second gear meshes of the transmission and having first and second gear ratio positions and a second shift rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller mounted for sliding movement between upper and lower positions along a predetermined generally vertical path of travel and a manually shiftable controller on which said manually movable controller is slidably mounted for generally vertical telescoping movement, said manually shiftable controller being mounted for rocking movement between forward and rearward positions along a monoplanar path of travel extending generally parallel to and adjacent one of the side walls of the cab enclosure, and wherein said mangy shiftable controller is twice moved into at least one of said forward and rearward positions to effect two different speed ratios for the transmission, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift rail assembly into a speed ratio position thereby conditioning the transmission into a specific speed ratio, and wherein said shift mechanism further includes a display arranged in the cab region of the implement for visually indicating which speed ratio condition has been selected for the transmission.

27. The shift mechanism according to claim 26 wherein said display is operated in response to signals received from sensors that sense the relative positions of the controllers.

28. A shift mechanism for an enclosed cab region of an off-highway implement, said cab region including vertically disposed front and rear walls which are joined to each other by vertical side walls, a floor and a roof, said implement being movable under the influence of a power train assembly including a self-propelled engine connected to a multi-speed transmission having a plurality of gear meshes, each transmission gear mesh providing a specific speed ratio between input and output ends of the transmission, said transmission further including a first shift rail assembly connected to first and second gear meshes of the transmission and having first and second gear ratio positions and a second shift rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller movable between upper and lower positions along a predetermined generally vertical path of travel and a manually shiftable controller on which said first controller is telescopically mounted, said second controller being mounted for rocking movement between forward and rearward positions along a monoplanar path of travel extending generally parallel to and adjacent one of the side walls of the cab enclosure, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift rail assembly into a speed ratio position thereby conditioning the transmission into a specific speed ratio; and and wherein said manually shiftable controller is mounted intermediate opposite ends thereof to a walled housing to which said shifter assembly is pivotally mounted for rocking movements about a fixed generally horizontal axis and such that said shifter assembly and housing can be mounted as a modular assembly.

29. A shift mechanism for an enclosed cab region of an off-highway implement, said cab region including vertically disposed front and rear walls which are joined to each other by vertical side walls, a floor and a roof, said implement being movable under the influence of a power train assembly including a self-propelled engine connected to a multi-speed transmission having a plurality of gear meshes, each transmission gear mesh providing specific speed ratio between input and output ends of the transmission, said transmission further including a first shift rail assembly connected to rest and second gear meshes of the transmission and having first and second gear ratio positions and a second shift rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller movable between upper and lower positions along a fixed generally vertical path of travel and a manually shiftable controller on which said first controller is mounted, said manually shiftable controller being mounted for rocking movement between forward and rearward positions along a monoplanar path of travel extending generally parallel to and adjacent one of the side walls of the cab enclosure, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift rail assembly into a speed ratio position thereby conditioning the transmission into a specific speed ratio; and wherein said first force transfer mechanism comprises a push/pull cable having one end connected to the manually movable controller and the other end connected to one of said shift rail selector assemblies.

30. A shift mechanism for an enclosed cab region of an off-highway implement, said cab region including vertically disposed front and rear walls which are joined to each other by vertical side walls, a floor and a roof, said implement being movable under the influence of a power train assembly including a serf-propelled engine connected to a multi-speed transmission having a plurality of gear meshes, each transmission gear mesh providing a specific speed ratio between input and output ends of the transmission, said transmission further including a first shift rail assembly connected to first and second gear meshes of the transmission and having first and second gear ratio positions and a second shift, rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller movable between upper and lower positions along a predetermined generally vertical path of travel and a manually shiftable controller on which said manually movable controller is mounted, said manually shiftable controller being mounted for rocking movement between forward and rearward positions along a monoplanar path of travel extending generally parallel to and adjacent one of the side walls of the cab enclosure, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift raft assembly into a speed ratio position thereby conditioning the transmission into a specific speed ratio; and wherein said second force transfer mechanism comprises a push/pull cable having one end connected to the manually shiftable controller and the other end connected to one of said shift rail selector assemblies.

31. A shift mechanism for an enclosed cab region of an off-highway implement, said cab region including vertically disposed front and rear walls which are joined to each other by vertical side walls, a floor and a roof, said implement being movable under the influence of a power train assembly including a self-propelled engine connected to a multi-speed transmission having a plurality of gear meshes, each transmission gear mesh providing a specific speed ratio between input and output ends of the transmission, said transmission further including a first shift rail assembly connected to first and second gear meshes of the transmission and having first and second gear ratio positions and a second shift rail assembly connected to at least a third gear mesh of the transmission, said shift mechanism comprising:

a shifter assembly connectable to said first and second shift rail assemblies for manually conditioning the transmission into a selected speed ratio, said shifter assembly comprising a manually movable controller mounted for sliding movement between upper and lower positions along a predetermined generally vertical path of travel and a manually shiftable controller on which said manually movable controller is mounted, said manually shiftable controller being mounted for rocking movement between forward and rearward positions about a fixed generally horizontal pivot axis disposed intermediate opposite ends of said manually shiftable controller thereby limiting rocking movements of said manually shiftable controller along a monoplanar path of travel extending generally parallel to and adjacent one of the side walls of the cab enclosure, said controllers being connected to said first and second shift rail assemblies through first and second force transfer mechanisms, respectively, such that vertical positioning movements of said manually movable controller selects which shift rail assembly is to be moved while forward and rearward positioning movements of the manually shiftable controller effects movements of the selected shift rail assembly into a speed ratio position thereby conditioning the transmission into a specific speed ratio.

* * * * *